United States Patent [19]

Harvell et al.

[11] Patent Number: 4,555,079
[45] Date of Patent: Nov. 26, 1985

[54] MULTIPLE JET BLOWING AROUND THE BLUNT TRAILING EDGE OF A CIRCULATION CONTROLLED AIRFOIL

[75] Inventors: John K. Harvell, Huber Heights; Milton E. Franke, Dayton, both of Ohio

[73] Assignee: The United States of America as represented by the Secretary of the Air Force, Washington, D.C.

[21] Appl. No.: 566,753

[22] Filed: Dec. 28, 1983

[51] Int. Cl.$^4$ .............................................. B64C 21/04
[52] U.S. Cl. .................................. 244/207; 244/12.5; 416/20 R; 416/23; 415/DIG. 1
[58] Field of Search ...................... 244/207, 208, 12.5; 416/20 R, 23, 90 A; 415/DIG. 1

[56] References Cited

U.S. PATENT DOCUMENTS

| | | | |
|---|---|---|---|
| 2,920,844 | 1/1960 | Marshall et al. | 244/207 |
| 3,168,997 | 2/1965 | Saunders | 244/207 |
| 3,554,664 | 1/1971 | Cheeseman et al. | 416/90 |
| 3,670,994 | 6/1972 | Kizilos | 244/42 CC |
| 3,713,750 | 1/1973 | Williams | 416/20 |
| 3,854,678 | 12/1974 | Geres | 244/12.5 |
| 3,873,233 | 3/1975 | Linck | 416/90 |
| 4,131,390 | 12/1978 | Schmidt | 416/20 R |

FOREIGN PATENT DOCUMENTS

1032113  6/1966  United Kingdom ................ 244/207

OTHER PUBLICATIONS

Kind et al., "An Experimental Investigation of a Low-Speed Circulation-Controlled Aerofoil," *The Aeronautical Quarterly*, May 1968, pp. 170-182.

Smith, "A Theoretical and Experimental Study of Circulation Control with Reference to Fixed Wing Application," (Dissertation) Jul. 1978.

Mayfield, "Circulation Control Wing Demonstrates Greater Lift," *Aviation Week & Space Technology*, Mar. 19, 1979.

*Primary Examiner*—Galen L. Barefoot
*Attorney, Agent, or Firm*—Donald J. Singer; John R. Flanagan

[57] ABSTRACT

A circulation controlled airfoil has a body structure with leading and trailing ends and upper and lower surfaces extending therebetween, and a cylindrical member disposed along the trailing end of the body structure between the upper and lower surfaces thereof so as to form a rounded, blunt trailing edge surface on the airfoil. A first blowing jet slot is defined between the outer surface of the cylindrical member and the trailing end of the body structure adjacent its upper surface. A second blowing jet slot is defined in a tubular wall of the cylindrical member. The latter member can be rotated to vary the distance of the second jet slot from the first jet slot and thereby adjust the point of separation of air flow along the airfoil from the outer surface of the blunt trailing edge surface formed by the cylindrical member. In such manner the lift generated by the airfoil can be optimized by providing blowing that is specifically tailored to given flight conditions. Also, the separate plenums are provided for supplying air flow to the respective jet slots.

5 Claims, 2 Drawing Figures

MULTIPLE JET BLOWING AROUND THE BLUNT TRAILING EDGE OF A CIRCULATION CONTROLLED AIRFOIL

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to circulation controlled airfoils and, more particularly, is concerned with the provision of multiple blowing jet slots at the blunt trailing edge surface of an airfoil such that the location of the jet slots relative to one another can be varied to provide optimized blowing for given flight conditions.

2. Description of the Prior Art

During recent years, there has been considerable interest in circulation control techniques that improve the short take-off and landing capabilities of fixed wing aircraft. There also has been interest in applying circulation control to helicopter rotors. One of the more promising circulation control techniques takes advantage of the Coanda effect, which allows a high speed jet to attach to and flow around a curved surface. This effect is primarily due to a balance between the centrifugal forces in the jet and the reduced pressure on a curved surface. Circulation control airfoils take advantage of this effect by introducing a jet of high energy air into the suction surface trailing edge region of a blunt-edged airfoil enabling the flow to remain attached for a greater distance before separation. Specifically, a two-dimensional wall jet slot is used to force the rear stagnation point down onto the lower surface of the airfoil with a corresponding increase in circulation and thereby lift. Airflow emerges from the jet slot in the form of a sheet that flows onto and around the surface of the trailing edge (due to Coanda effect). The air adheres to the rounded surface and then separates downward off the trailing edge.

Some advantages of circulation control become apparent when comparisons are made with conventional airfoil designs. For example, conventional airfoils with mechanical flaps usually cannot produce the high lift coefficients possible with blown airfoils due to the onset of flow separation. Also, blown airfoils are able to vary lift simply by varying the blowing rate.

Research has shown that the lift of the airfoil for a given blowing coefficient can be improved by using more than one blowing jet slot. To increase the lift over that obtained with single jet blowing, the dual jet slots must be positioned advantageously in the trailing edge region of the airfoil to prevent flow separation and enable the movement of the stagnation points. U.S. Pat. No. 3,873,233 to Linck discloses a circulation controlled airfoil having a pair of blowing jet slots along and tangential to the blunt trailing edge surface of the airfoil. Kind and Maull, in "An Experimental Investigation of a Low-Speed Circulation-Controlled Aerofoil," *The Aeronautical Quarterly*, Vol. 19, May 1968, pages 170–182, reported on results using two jet slots in the trailing edge region of the airfoil; however, their jet slots opposed each other, and flow from the second jet slot reduced lift. Also, R. V. Smith, in "A Theoretical and Experimental Study of Circulation Control with reference to Fixed Wing Applications," *Research Paper No. 582*, University of Southampton, U.K., July 1978, reported on multiple jet slots which could be rotated together around the trailing edge, but were fixed relative to each other.

Advantageously located multiple jet slots would appear to provide an effective means for increasing the lift coefficient; however, it is perceived that there exists a need for improvements being made thereto in order to enhance their adaptability to varying flight conditions.

SUMMARY OF THE INVENTION

The present invention provides improvements in a circulation controlled airfoil designed to satisfy the aforementioned need. The use of multiple blowing jet slots whose locations relative to one another can be varied provides optimized blowing over a wide range of flight conditions. Although a rotating cylindrical member is used similar to that proposed by Smith, the member is used to locate the second jet slot relative to the first jet slot thereby enabling the optimization of lift recovery at lower energy levels. This results in a higher lift coefficient with two blowing jet slots without increasing total momentum and energy required. Also, with separate airflow plenums feeding the respective jet slots, the plenum pressure and consequently the blowing velocities of the jet slots can be varied relative to each other.

Accordingly, the present invention is directed to improvements in a circulation controlled airfoil which includes a body structure and an elongated cylindrical member. The body structure of the airfoil has leading and trailing ends with an upper suction surface and a lower pressure surface extending between the ends. The cylindrical member is disposed along the trailing end of the body structure between the upper and lower surfaces thereof and has an outer cylindrical surface which provides a rounded, blunt trailing edge surface. In an improved form of the airfoil, a first elongated blowing jet slot is defined between the outer surface of the cylindrical member and the trailing end of the body structure adjacent its upper surface, and a second elongated blowing jet slot is defined in a tubular wall of the cylindrical member. The cylindrical member is rotatable relative to the trailing end of the body structure for varying the distance between the first and second jet slots and thereby enabling optimized lift generation by providing blowing that is tailored to given flight conditions.

Furthermore, the trailing end of the body structure at its upper surface includes a first, blade-like segment which extends in tangential but spaced relationship to the outer surface of the cylindrical member and in cooperation with the outer surface thereof defines the first jet slot. The tubular wall of the cylindrical member includes a second, blade-like segment which is spaced from a ledge formed in the wall. A cylindrical tube is mounted within the cylindrical member at the location of the ledge on the tubular wall and has an outer surface spaced from the second blade-like segment. The latter extends in tangential but spaced relationship to the outer surface of the cylindrical tube and in cooperation therewith defines the second jet slot. Still further, the body structure includes a first air flow plenum communicating only with the first jet slot, whereas the cylindrical member constitutes a second air flow plenum communicating only with the second jet slot. With separate plenums for the respective jet slots, plenum air flow pressures and consequently blowing velocities of the jet slots can be varied relative to each other.

DETAILED DESCRIPTION OF THE INVENTION

Figure 1:
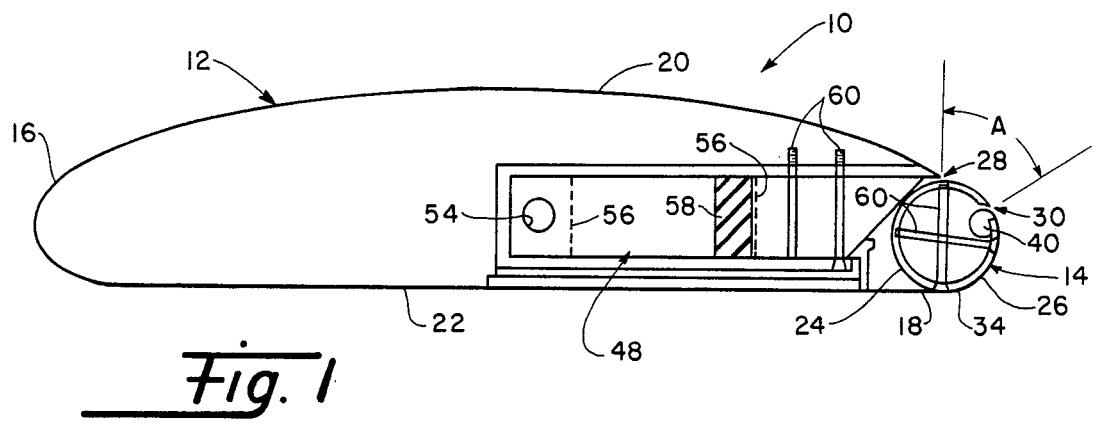
FIG. 1 is a cross-sectional view of a circulation controlled airfoil embodying the principles of the present invention.
Figure 2:
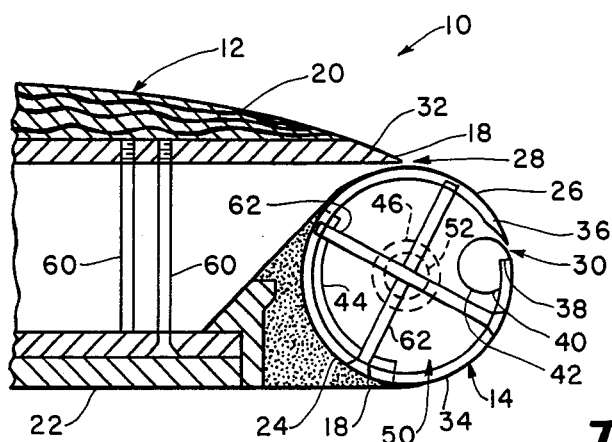
FIG. 2 is an enlarged fragmentary cross-sectional view of the trailing edge region of the airfoil of FIG. 1.

Referring now to FIGS. 1 and 2 of the drawings, there is shown a circulation controlled airfoil, being generally designated 10, which incorporated the improvements of the present invention. The airfoil 10 includes a body structure 12 and a cylindrical member 14. The body structure 12 has leading and trailing ends 16 and 18 with an upper suction surface 20 and a lower pressure surface 22 extending between the ends. The cylindrical member 14 is disposed along the trailing end 18 of the body structure 12 between the upper and lower surfaces 20, 22 thereof such that approximately 180 degrees of the circumference of its outer cylindrical surface 24 protrudes rearwardly to provide the airfoil 10 with a rounded, blunt trailing edge surface 26.

The improvements provided by the present invention relate to the manner in which a pair of first and second elongated blowing jet slots 28 and 30 are formed and the ability to vary the positions of the slots relative to one another. The first blowing jet slot 28 is located at the trailing end 18 of the body structure 12 adjacent its upper surface 20. The first slot 28 is formed by a first blade-like segment 32 in cooperation with the outer surface 24 of the cylindrical member 14. The blade-like segment 32 extends in a generally tangential relationship to the outer cylindrical surface 24 but is spaced therefrom to form the first jet slot 28 with a height, for example, of 0.02 inch. The second blowing jet slot 30 is located along the outer surface 24 of the cylindrical member 14. The second slot 30 is formed in a tubular wall 34 of the cylindrical member 14. The tubular wall 34 includes a second blade-like segment 36 spaced from a ledge 38 formed in the wall 34. Also, a cylindrical tube 40 is mounted inside the cylindrical member 14 to the tubular wall thereof at the location of the ledge 38. The cylindrical tube 40 has an outer cylindrical surface 42 which is spaced from the second blade-like segment 36. The latter extends in a generally tangential relationship to the outer surface 42 of the cylindrical tube 40 and in cooperation therewith forms the second slot 30 with a height, for example, of 0.02 inch.

For varying the distance between or positions of the first and second blowing jet slots 28, 30, the cylindrical member 14 is rotatably mounted to the body structure 12 by any suitable means, such as a plurality of arcuate-shaped brackets 44 (only one of which is seen in FIG. 2), and may be rotated by operation of any suitable drive means, such as an electric or hydraulic motor 46, drivingly coupled to an end of the cylindrical member 14. Rotation of the cylindrical member 14 relative to the trailing end of the body structure 12 at its upper surface 20, for example, through angle A, will vary the distance between the first and second jet slots 28, 30 and, as a consequence, enables optimized lift generation for the airfoil 10 at the given flight condition.

In the illustrated embodiment, the cylindrical member 14 may be rotated to vary the position of the second blowing jet slot 30 from 0 to 180 degrees relative to the position of the first blowing jet slot 28.

Additional improvements of the present invention relates to the provision of separate sources of air flow to the first and second jet slots 28, 30. The body structure 12 includes a first air flow plenum 48 communicating only with the first jet slot 28, whereas the interior of the cylindrical member 14 constitutes a second air flow plenum 50 with a central inlet 52 communicating only with the second jet slot 30. As seen in FIG. 1, the first plenum 42 has an inlet 54 through which air from any suitable source flows into the plenum and through its interior to the first jet slot 28. Within the interior of the plenum 48 are positioned a pair of screens 56 and an air-permeable foam block 58 which acts to uniformly distribute the pressure of air flow through the first jet slot 28. With separate plenums 48, 50 for the respective jet slots 28, 30, plenum air flow pressures and consequently blowing velocities of the jet slots can be varied relative to each other.

The heights of the respective jet slots 28 and 30 are set and maintained by the tension screws 60 and 62 contained in the body structure 12 and cylindrical member 14, respectively.

An experimental model of the airfoil is depicted in FIGS. 1 and 2. It is a 20-percent thick, 8.5 percent cambered, elliptical airfoil with provisions for two tangentially blow jet slots, as described above. The model had a span of 26 inches, a chord of 20.32 inches, and was designed with a separate plenum for each blown jet slot also as described above. The location for the first blowing slot 28 was fixed at 94.5 percent chord. The second jet slot 30 was varied around the blunt trailing surface 26 of the airfoil 10. Test results showed that over a range blowing coefficients the lift coefficient was increased in some cases more than 50 percent. While the invention has not been applied to an operational aircraft, it is believed to have potential application in a variety of military aircraft, for example, to improve the low speed performance of fixed wing military aircraft and, particularly, for short takeoff and landing; to increase load carrying capacity; and to improve the performance of rotary wing aircraft.

It is thought that the circulation controlled airfoil having the improvements of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely an exemplary embodiment thereof.

We claim:

1. In a circulation controlled airfoil including a body structure and an elongated cylindrical member, said body structure having leading and trailing ends with an upper suction surface and a lower pressure surface extending between said ends, said cylindrical member being disposed along said trailing end of said body structure between said upper and lower surfaces thereof and having an outer cylindrical surface which provides a rounded, blunt trailing edge surface, the improvement which comprises:

a. said outer surface of said cylindrical member and said trailing end of said body structure adjacent said upper surface defining a first elongated blowing jet slot;
b. said cylindrical member including a tubular wall having a second elongated blowing jet slot defined therein; and
c. said cylindrical member being rotatable relative to said trailing end of said body structure whereby the distance between said first and second jet slots is selectable to optimize lift generation for said airfoil at a predetermined flight condition.

2. The airfoil as recited in claim 1, wherein:
said body structure defines a first air flow plenum communicating only with said first jet slot; and
said cylindrical member defines a second air flow plenum communicating only with said second jet slot, whereby plenum air flow pressures and blowing velocities of air through respective said jet slots can be selectively varied relative to each other.

3. The airfoil as recited in claim 2, wherein said first air flow plenum includes an air-permeable foam block for uniformly distributing the pressure of air flow through said first jet slot.

4. The airfoil as recited in claim 1, wherein said trailing end of said body structure at said upper surface includes a first, blade-like segment disposed in tangential and spaced relationship to the outer surface of said cylindrical member and in cooperation with the outer surface of said cylindrical member defines said first blowing jet slot.

5. The airfoil as recited in claim 1,
wherein said tubular wall of said cylindrical member includes a second, blade-like segment and a ledge formed in said wall and spaced from said second segment; and
further comprises a cylindrical tube mounted within said cylindrical member at said ledge on said tubular wall and has an outer surface spaced from said second segment, said second segment extending tangential relationship to said outer surface of said tube and in cooperation therewith defines said second blowing jet slot.

* * * * *